United States Patent
Balensiefer et al.

(10) Patent No.: US 7,055,903 B2
(45) Date of Patent: Jun. 6, 2006

(54) ADJUSTOR FOR JUVENILE VEHICLE SEAT

(75) Inventors: Eugene Roy Balensiefer, Seymour, IN (US); Philip W. Burbrink, Columbus, IN (US); Trevor Brown, Salem, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/873,367

(22) Filed: Jun. 22, 2004

(65) Prior Publication Data

US 2005/0173956 A1    Aug. 11, 2005

Related U.S. Application Data

(60) Provisional application No. 60/535,240, filed on Jan. 9, 2004.

(51) Int. Cl.
*A47D 1/10* (2006.01)
*B60N 2/28* (2006.01)
*A47C 7/38* (2006.01)

(52) U.S. Cl. ............ 297/256.11; 297/250.1; 297/256.1; 297/353; 297/410

(58) Field of Classification Search ........... 297/250.1, 297/256.1, 256.11, 410, 353
See application file for complete search history.

(56) References Cited

U.S. PATENT DOCUMENTS

| | | |
|---|---|---|
| 3,265,437 A | 8/1966 | Mincieli |
| 3,910,634 A | 10/1975 | Morris |
| 4,040,664 A | 8/1977 | Tanaka et al. |
| 4,047,755 A | 9/1977 | McDonald et al. |
| 4,342,483 A | 8/1982 | Takada |
| 4,376,551 A | 3/1983 | Cone |
| 4,545,617 A | 10/1985 | Drexler et al. |
| 4,632,456 A | 12/1986 | Kassai |
| 4,709,960 A | 12/1987 | Launes |
| 4,790,601 A | 12/1988 | Burleigh et al. |
| 4,854,639 A | 8/1989 | Burleigh et al. |
| 4,858,997 A | 8/1989 | Shubin |
| 4,915,446 A | 4/1990 | Darling et al. |
| 5,082,325 A | 1/1992 | Sedlack |
| 5,106,158 A | 4/1992 | Dukatz et al. |
| 5,181,761 A | 1/1993 | Meeker |

(Continued)

FOREIGN PATENT DOCUMENTS

EP        155784 A2 *  9/1985  ............ 297/256.1

(Continued)

OTHER PUBLICATIONS

Graco ® Website, 1 page, dated Jun. 9, 2004, entitled TurboBooster ® 8674PRN, www.gracobaby.com.

(Continued)

*Primary Examiner*—Rodney B. White
(74) *Attorney, Agent, or Firm*—Barnes & Thornburg LLP

(57) ABSTRACT

A juvenile vehicle seat includes a seat shell having a seat bottom and a back support coupled to the seat bottom. A headrest of the juvenile vehicle seat is coupled to the seat shell for up-and-down movement relative to the seat shell to adjust a height of the headrest above the seat bottom of the seat shell. The juvenile vehicle seat further includes a height-adjustment mechanism arranged to adjust the height of the headrest above the seat bottom. The height-adjustment mechanism is arranged to move between a locked position to prevent up-and-down movement of the headrest and an unlocked position to permit up-and-down movement of the headrest.

43 Claims, 4 Drawing Sheets

U.S. PATENT DOCUMENTS

| | | |
|---|---|---|
| 5,335,964 A | 8/1994 | Sedlack et al. |
| 5,344,213 A | 9/1994 | Koyanagi |
| 5,468,046 A | 11/1995 | Weber et al. |
| 5,527,094 A | 6/1996 | Hiramatsu et al. |
| 5,580,126 A | 12/1996 | Sedlack |
| 5,775,772 A | 7/1998 | Lefranc |
| D413,026 S | 8/1999 | Reithmeier |
| 6,000,753 A | 12/1999 | Cone, II |
| 6,019,426 A * | 2/2000 | Nakagawa ............. 297/256.11 |
| 6,030,047 A | 2/2000 | Kain |
| 6,045,184 A * | 4/2000 | Nakagawa ............... 297/250.1 |
| 6,135,553 A | 10/2000 | Lovie et al. |
| 6,139,100 A | 10/2000 | Baskin-Lockman et al. |
| 6,139,101 A | 10/2000 | Berringer et al. |
| 6,155,638 A | 12/2000 | Bapst |
| 6,189,970 B1 | 2/2001 | Rosko |
| 6,273,509 B1 | 8/2001 | Reithmeier et al. |
| 6,299,249 B1 | 10/2001 | Mori |
| 6,378,950 B1 | 4/2002 | Takamizu et al. |
| D461,320 S | 8/2002 | Sher |
| 6,428,099 B1 | 8/2002 | Kain |
| 6,428,100 B1 | 8/2002 | Kain et al. |
| 6,464,294 B1 | 10/2002 | Kain |
| 6,481,794 B1 | 11/2002 | Kassai et al. |
| 6,485,101 B1 | 11/2002 | Kassai et al. |
| 6,491,348 B1 | 12/2002 | Kain |
| 6,547,333 B1 | 4/2003 | Parenteau et al. |
| 6,554,358 B1 | 4/2003 | Kain |
| 6,623,074 B1 | 9/2003 | Asbach et al. |
| 6,659,564 B1 | 12/2003 | Kassai et al. |
| 6,705,675 B1 * | 3/2004 | Eastman et al. ......... 297/250.1 |
| 6,811,216 B1 * | 11/2004 | Sedlack .................... 297/250.1 |
| 6,834,915 B1 * | 12/2004 | Sedlack ............... 297/256.1 X |
| 6,857,700 B1 * | 2/2005 | Eastman et al. ......... 297/250.1 |
| 2001/0011838 A1 | 8/2001 | Kassai et al. |
| 2002/0145318 A1 | 10/2002 | Asbach et al. |
| 2002/0195867 A1 | 12/2002 | Barger et al. |
| 2003/0151282 A1 * | 8/2003 | Williams et al. ......... 297/250.1 |
| 2004/0124676 A1 * | 7/2004 | Kain ....................... 297/250.1 |
| 2004/0124678 A1 | 7/2004 | Williams et al. |
| 2004/0189068 A1 * | 9/2004 | Meeker et al. ........... 297/250.1 |
| 2005/0189806 A1 * | 9/2005 | Hall et al. ............. 297/256.11 |
| 2005/0200177 A1 * | 9/2005 | Balensiefer ............... 297/250.1 |
| 2005/0212342 A1 * | 9/2005 | Kain et al. .................. 297/410 |
| 2005/0225136 A1 * | 10/2005 | Horton et al. ........... 297/250.1 |

FOREIGN PATENT DOCUMENTS

| | | | |
|---|---|---|---|
| EP | 232237 A2 * | 8/1987 | ................. 297/410 |
| JP | 05254366 A * | 10/1993 | .............. 297/256.1 |

OTHER PUBLICATIONS

Britax USA Website, 1 page, dated Jun. 9, 2004, entitled Starriser Comfy, www.britaxusa.com.

Britax USA Website, 2 pages, dated Jun. 9, 2004, entitled Bodyguard booster with Side Impact Protection, www.britaxusa.com.

Britax USA Website, 1 page, dated Jun. 9, 2004, entitled Roadster, www.britaxusa.com.

* cited by examiner

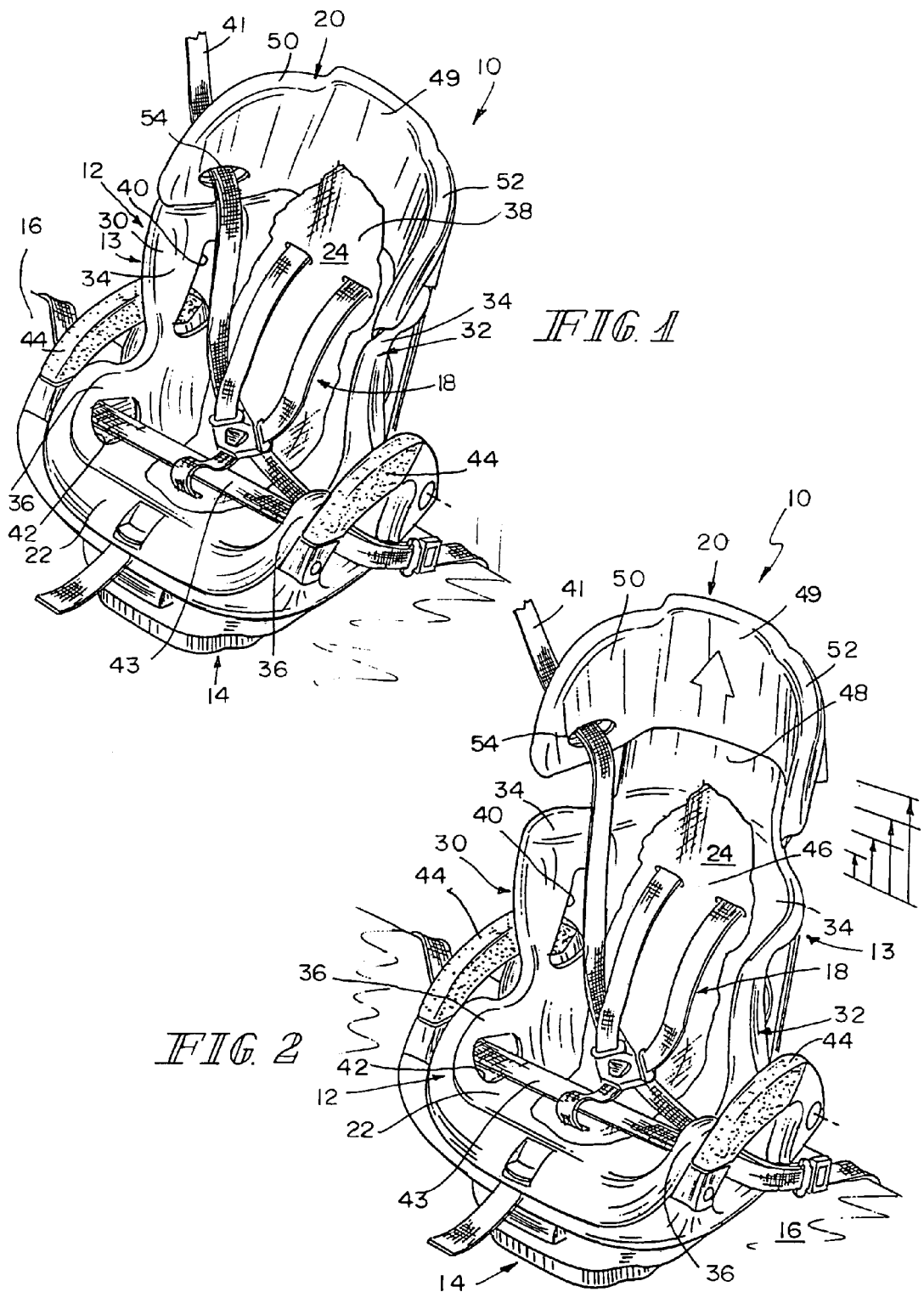

ADJUSTOR FOR JUVENILE VEHICLE SEAT

CROSS-REFERENCE TO RELATED APPLICATIONS

This application claims priority under 35 U.S.C. 119(e) to U.S. Provisional Application Ser. No. 60/535,240, filed Jan. 9, 2004, the disclosure of which is expressly incorporated by reference herein.

BACKGROUND

The present disclosure relates to a juvenile seat for use in a vehicle, and in particular to a juvenile seat having a movable headrest and a height-adjustment mechanism for raising and lowering the headrest. More particularly, the present disclosure relates to an apparatus for locking and unlocking the height-adjustment mechanism.

Many juvenile seats are formed to include a headrest which adjusts upwardly and downwardly relative to a seat bottom of the juvenile seat. Such a juvenile seat can be adapted by a user to seat children of different sizes.

SUMMARY

According to the present disclosure, a juvenile vehicle seat includes a seat shell having a seat bottom and a back support coupled to the seat bottom. A headrest is coupled to the seat shell for up and down movement relative to the seat shell to adjust a height of the headrest above the seat bottom of the seat shell. A height-adjustment mechanism of the seat adjusts the height of the headrest above the seat bottom. The height-adjustment mechanism includes a "twist-to-actuate" lock-release dial actuator that is mounted to be rotated by a user to raise and lower the headrest.

In illustrative embodiments, the height-adjustment mechanism includes a housing cover and the dial actuator. The housing cover is coupled to the headrest and movable with the headrest. The dial actuator is coupled to the housing cover and arranged to move between a locked position to prevent up and down movement of the headrest relative to the seat shell and an unlocked position to permit up and down movement of the headrest relative to the seat shell.

The height-adjustment mechanism further includes vertically-spaced lock-receiving locators provided in a slide rail coupled to the back support of the seat shell. The mechanism also includes a lock arranged to move between a first position received within one of the lock-receiving slots when the height-adjustment mechanism is in the locked position and a second position disengaged from the slide rail when the height-adjustment mechanism is in the unlocked position.

The dial actuator is coupled for rotation to a rear side of the housing cover and includes a drive lug movable with the dial actuator relative to the housing cover. A lock-release strap or member of the height-adjustment mechanism is coupled at a first end to the drive lug. A cam is provided at a second end of the lock-release strap such that as the dial actuator and drive lug are rotated, the drive lug causes the cam at the second end of the lock-release strap to engage the lock and move the lock to the second position disengaged from the lock-receiving slots to permit a user to move the headrest up and down relative to the seat shell.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a front perspective view of a juvenile vehicle seat mounted on a tiltable base showing an adjustable headrest of the seat located in a lowered position and arranged to move up and down relative to a seat bottom of the seat to adjust the height of the headrest above the seat bottom of the seat;

FIG. 2 is a front perspective view of the juvenile vehicle seat and base of FIG. 1 showing the headrest in a raised position above the seat bottom of the seat and also showing a shoulder belt portion of a vehicle seat belt received through a belt aperture of the headrest for up and down movement therewith;

DETAILED DESCRIPTION

Figure 3:
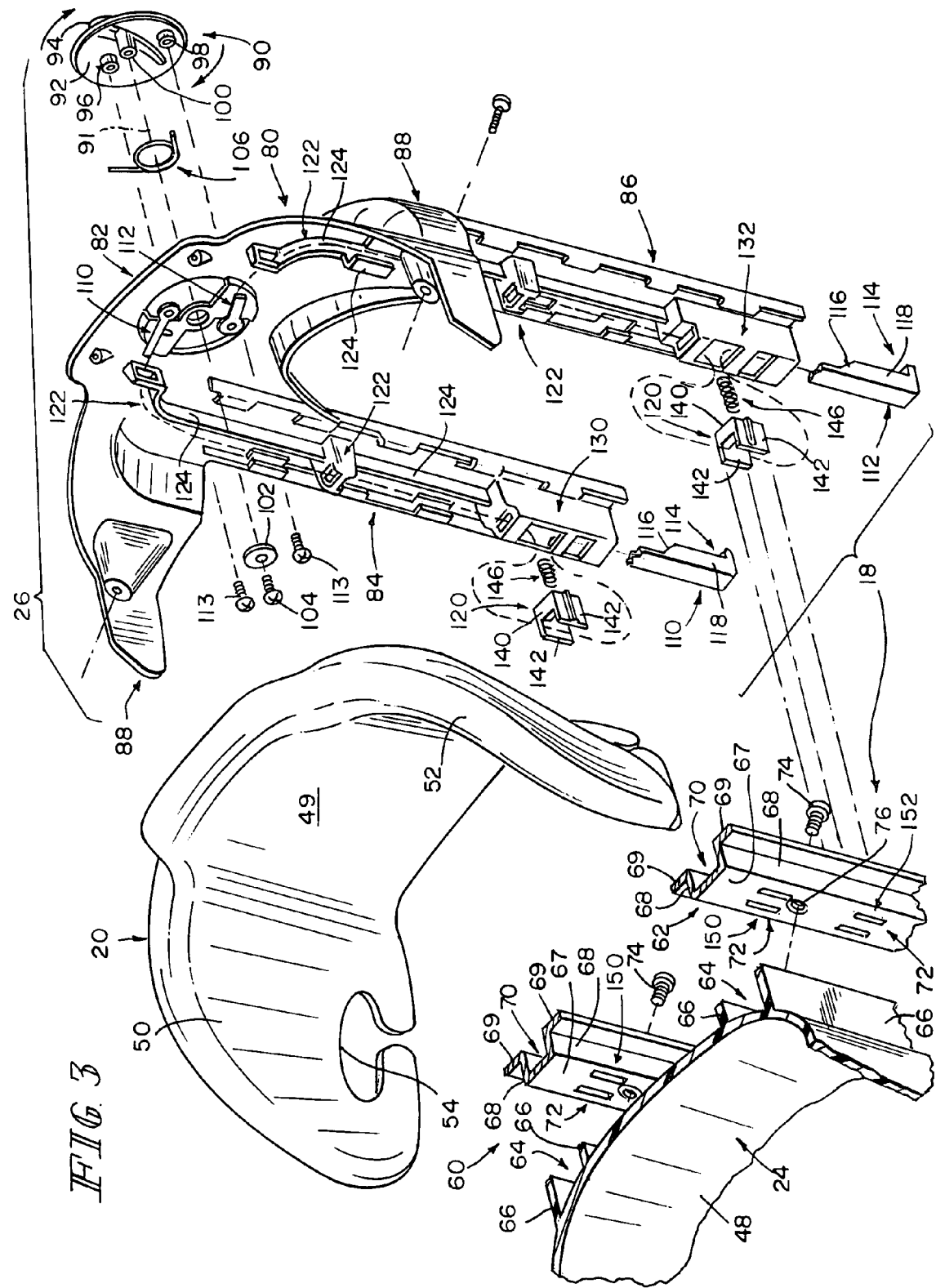
FIG. 3 is a perspective exploded view of a portion of the juvenile vehicle seat of FIGS. 1 and 2 showing an upper portion of a back support of the seat, the headrest, and a twist-to-actuate lock-release mechanism arranged to move between a locked position to prevent the headrest from moving up and down relative to the bottom support portion and an unlocked position to permit the headrest to move up and down relative to the bottom support portion, and also showing the lock-release mechanism including a pair of slide rails coupled to the back support, a housing cover coupled to the headrest for up and down movement therewith, a rotatable dial actuator coupled to the housing cover, a pair of lock-release straps coupled to the actuator for movement therewith and received along a guide system of the housing cover, a cam coupled to the end of each lock-release strap, and a pair of locks each coupled to the housing cover and spring-biased into locking engagement with slots formed in the slide rails to prevent up and down movement of the headrest (and housing cover) relative to the back support.

A juvenile vehicle seat assembly 10 including a juvenile vehicle seat 12 mounted on a tiltable base 14 is provided for supporting juveniles therein. Seat assembly 10 may be coupled to a vehicle seat 16 provided within a vehicle (not shown), for example, as shown in FIG. 1, to secure the juvenile within the vehicle. Juvenile vehicle seat 12 of assembly 10 may also be secured to vehicle seat 16 without the use of base 14; further base 14 may be used as backless booster seat and secured to vehicle seat 16 without the use of juvenile seat 12.

Juvenile vehicle seat 12 includes a height-adjustment mechanism or height-adjusting means 18 (shown in FIG. 3) arranged to adjust the height of a headrest 20 of the seat 12 up and down relative to both a seat bottom 22 of the seat 12 and a back support 24 of seat 12 in order to accommodate small- and large-sized children therein. As discussed in greater detail below, height-adjustment mechanism 18 includes a lock-release mechanism 26 manually adjusted by a user to move between a locked position (shown in FIGS. 5 and 6) to prevent the headrest 20 from up and down movement relative to the seat bottom 22 and an unlocked position (shown in FIGS. 4 and 7–10) to permit the headrest 20 to move up and down relative to the seat bottom 22.

In the illustrated embodiment, lock-release mechanism 26 includes a rotatable "twist-to-actuate" dial actuator 90 that can be turned easily by a user to raise and lower headrest 20. Dial actuator 90 is located on a rearwardly facing side of back support 24 as shown, for example, in FIG. 4. Dial actuator 90 is connected to flexible members or coupling-members (e.g., straps) 110, 112 that move to activate a spring-loaded locking clip. When dial actuator 90 is turned, headrest 20 is "unlocked" and able to be moved. As headrest 20 is raised to the next position, the spring reengages the lock.

As shown in FIG. 1, seat assembly 10 includes a juvenile vehicle seat 12 and a tiltable base 14. Seat 12 is illustratively mounted to base 14 in a forward-facing position relative to base 14 and assembly 10 is positioned in a forward-facing position on vehicle seat 16. As mentioned above, seat 12 and base 14 may be used independent of each other and may be mounted in rearward-facing positions as well.

Seat 12 includes a seat shell 13, headrest 20 coupled to seat shell 13, and a juvenile-restraint harness 18 coupled to seat shell 13 for restraining a juvenile seated therein. Seat shell 13 includes seat bottom 22 adapted to support a juvenile's bottom and upper legs and back support 24 coupled to seat bottom 22 and positioned at an angle to seat bottom 22 to provide a backrest surface for the juvenile seated therein. First and second side walls 30, 32 are provided to prevent lateral movement of the juvenile seated in seat 10 and lie on opposite sides of seat bottom 22 and back support 24.

Specifically, each side wall 30, 32 includes an upper side wall portion 34 positioned on opposite sides of back support 24 and a lower side wall portion 36 coupled to the respective upper side wall portion 34 and positioned on opposite sides of seat bottom 22. A cushion or cloth covering 38 is illustratively provided for covering the seat bottom 22, back support 24, and/or headrest 20 for added comfort and/or appearance. Each upper side wall portion 34 includes a belt-receiving aperture 40 formed to receive a shoulder strap portion 41 of vehicle seat belt therethrough when seat 12 is positioned in a rear-facing direction (not shown). Each lower side wall portion 36 also includes a belt-receiving aperture 42 formed to receive a lap portion 43 of the vehicle seat belt therethrough when seat 12 is positioned on a forward-facing direction, as shown, for example, in FIGS. 1 and 2. A portion of shoulder belt 41 is also received through the belt-receiving aperture 42 of one of the lower side wall portions 36. Armrests 44 of the base 14 also form openings for receiving one or more portions 41, 43 of the vehicle seat belt therein.

As shown in FIGS. 2 and 3, back support 24 includes a lower backrest section 46 to which upper side wall portions 34 of side walls 30, 32 are appended and an upper backrest section 48 to which headrest 20 is mounted. Illustratively, headrest 20 includes a main body 49 and first and second wing members 50, 52 coupled to opposite edges of main body 49 and positioned to lie in spaced-apart relation to one another. Each wing member 50, 52 is oriented to lie at an angle relative to main body 49, as shown in FIGS. 1 and 2, for example. Each wing member 50, 52 further includes an aperture 54 formed to receive shoulder strap portion 41 of the vehicle seat belt therethrough. As shown in FIG. 2, the shoulder strap portion 41 is caused to move upwardly (or downwardly) with the headrest 20 as headrest 20 moves up and down relative to seat shell 13.

The up-and-down movement of headrest 20 relative to seat shell 13 functions to raise and lower headrest 20 above seat bottom 22 of seat shell 13 to accommodate small- and large-sized juveniles. Headrest 20 moves up and down relative to seat shell 13 to assure proper fit for a juvenile seated in seat 12. A caregiver can raise and lower headrest 20 to change the height of headrest 20 by operating height-adjustment mechanism 18 using a "twist-to-actuate" motion. As is discussed in greater detail below, a portion of height-adjustment mechanism 18 is coupled to back support 24 while other portions of height-adjustment mechanism 18 are coupled to headrest 20 for up and down movement with headrest 20.

Looking now to FIG. 3, height-adjustment mechanism 18 includes first and second slide rails 60, 62 coupled to back support 24 of seat shell 13. Illustratively, each slide rail 60, 62 is positioned within a channel 64 provided in back support 24 formed by rib portions 66 coupled to a rear side of back support 24. Each slide rail 60, 62 includes an end wall 67, opposite side walls 68 coupled to end wall 67, and flange portions 69 coupled to each side wall 68. End wall 67 and opposite side walls 68 cooperate to define channels 70 formed to receive additional portions of height-adjustment mechanism 18 therein.

Each slide rail 60, 62 further includes lock-receiving locators, illustratively provided as pairs of slots 72 provided along a vertical length of each respective slide rail 60, 62. Thus, a first set of lock-receiving locators is provided along the length of slide rail 60 and a second set of lock-receiving locators is provided along the length of slide rail 62. As will be discussed in more detail below, each pair of slots 72, or each parallel set of slots 72, corresponds to a vertical height above seat bottom 22 to which headrest 20 of seat 12 may be positioned to accommodate a particular child, for example. Illustratively, each slide rail 60, 62 is coupled to back support 24 by one or more fasteners, such as illustrative screws 74, received through one or more apertures 76 formed through end wall 67 of each slide rail 60, 62. As mentioned above, slide rails 60, 62 are rigidly attached to back support 24 of seat shell 13 and do not move up or down with headrest 20. Slide rails 60, 62 simply act as guides for other portions of height-adjustment mechanism 18.

Looking again to FIG. 3, height-adjustment mechanism 18 further includes a housing cover 80 coupled to back support 24 for up and down movement relative to back support 24. Headrest 20 is coupled to housing cover 80 for up and down movement therewith. Illustrative housing cover 80 is generally "U-shaped" and includes an upper portion 82 which may be considered the base of the "U" and first and second arms 84, 86 coupled to upper portion 82 of housing cover 80 and positioned to lie in spaced-apart relation to each other. Wing portions 88 of housing cover 80 are coupled to upper portion 82 and are positioned to lie at an angle to upper portion 82. Wing portions 88 of housing cover 80 are coupled to wing members 50, 52 of headrest 20.

As mentioned above, height-adjustment mechanism 18 includes lock-release mechanism 26 movable between locked and unlocked positions to either prevent or permit a caregiver from moving headrest 20 up or down relative to seat bottom 22. Lock-release mechanism 26 is coupled to housing cover 80 of height-adjustment mechanism 18. Lock-release mechanism 26 includes a rotatable actuator 90 coupled to housing cover 80 for rotatable movement relative thereto about an axis of rotation 91. Actuator 90 includes a circular main body 92, a handle 94 coupled to a front side of main body 92, and first and second drive lugs 96, 98 coupled to a rear side of main body 92. Handle 94 is provided for a user to grab in order to rotate actuator 90, as is discussed below. A central post 100 is coupled to rear side of main body 92 to attach actuator 90 to housing cover 80 illustratively through the use of a washer 102 and screw 104. A rotational or return spring 106 of lock-release mechanism 26 is coupled to actuator 90 and is provided to bias (e.g., yieldably rotate) actuator 90 to the locked position.

Figure 4:
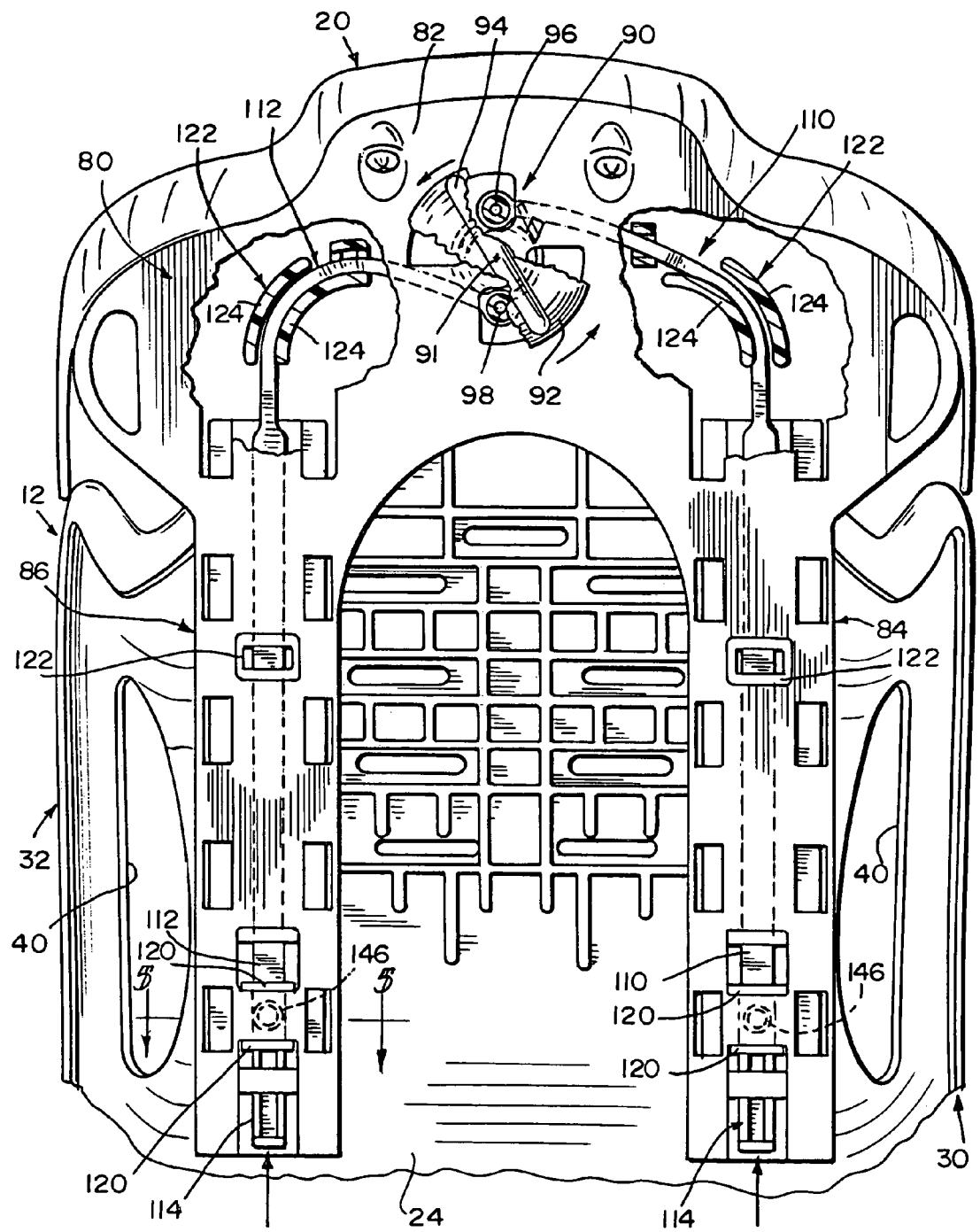
FIG. 4 is an enlarged rear view of the headrest and housing cover of the seat, with portions broken away, showing the actuator having been rotated counter-clockwise to move the lock-release mechanism to the unlocked position to allow a user to move the headrest up and down relative to the back support.

A first lock-release strap 110 of lock-release mechanism 26 is coupled at a first end to the first drive lug 96 of actuator 90 while a second lock-release strap 112 of lock-release mechanism 26 is coupled at a first end to the second drive lug 98, as shown best in FIG. 4. Each lock-release strap 110, 112 is coupled to actuator 90 for movement therewith between the locked and unlocked positions. A second end of each of the first and second lock-release straps 110, 112 includes a cam 114 having an angled cam face or ramp edge 116 formed in side wall portions 118 of each lock-release strap 110, 112, as shown in FIG. 3. As is discussed in more detail below, the function of each cam face 114 is to engage a lock or ramp follower 120 and move the lock 120 to the unlocked position to permit a caregiver to move the headrest 20 up or down. Illustratively, the lock-release straps 110, 112 are made of a plastics material. However, it is within the scope of this disclosure to include lock-release straps made of other suitable materials.

As shown in FIGS. 3 and 4, each lock-release strap 110, 112 is positioned along a guide system 122 coupled to housing cover 80. Guide system 122 for each lock-release strap 110 is generally "L-shaped" and includes generally parallel guide rib portions 124 coupled to and positioned along first and second arms 84, 86 of housing cover 80. First and second lock housings 130, 132 of lock-release mechanism 26 are coupled to respective arms 84, 86 of housing cover 80 and are positioned along the guide path of guide system 122. Each lock housing 130, 132 houses one of the locks 120 discussed above. First lock-release strap 110 is received through first lock housing 130 and second lock-release strap 112 is received through second lock housing 132.

One lock 120 is provided within each lock housing 130, 132. Each lock 120 includes a main body 140 and parallel arms 142 coupled to main body 140 and positioned to extend outwardly therefrom in a direction toward back support 24. Arms 142 are spaced-apart from each other and are formed to be received within the pairs of slots 72 formed in each of the first and second slide rails 60, 62 coupled to back support 24. In fact, in the locked position, arms 142 of each lock 120 are received within slots 72 of the respective slide rails 60, 62 and are disengaged from the slide rails 60, 62 in the unlocked position to permit a user to move the headrest 20 (and housing cover 80) up and down relative to back support 24 of seat shell 13. A spring 146 is associated with each lock 120 to bias each lock 120 to the locked position engaged with the slide rails 60, 62 such that the arms 142 of each lock 120 are received within slots 72 of the slide rails 60, 62. As shown in FIGS. 5–10, spring 146 of each lock 120 is positioned at one end about a spring mount 148 of the respective lock 120 and a back wall 149 of the respective lock housing 130, 132 to bias the respective lock 120 into engagement with slots 72.

As shown in FIG. 3, lock-receiving slots 72 include a first pair of slots 150 to define the "highest" position of headrest 20, a second pair of slots 152 to define a "middle" position of headrest 20, and a third pair of slots (not shown) to define a "lowest" position of headrest 20. Illustratively, three pairs of slots are provided in each slide rail 60, 62 to provide for three distinct positions of headrest 20 above seat bottom 22 of seat shell 13. It is within this disclosure, however, to provide any suitable number of lock-receiving locators or slots 72 formed to receive the locks 120 therein to position the headrest 20 at any number of heights above seat bottom 22.

In operation, a user "twists" and rotates the actuator 90 about axis of rotation 91 in a counter-clockwise direction (as shown in FIG. 4) to move the height-adjustment mechanism 18 and the lock-release mechanism 26 to the unlocked position to allow the user to move the headrest 20 up and down relative to the seat shell 13. As shown in FIG. 4, the rotational movement of actuator 90 in a counter-clockwise direction, against the bias of rotational spring 106, causes the first end of first lock-release strap 110 to move generally laterally to the left in order to move the second end of first lock-release strap 110 upwardly along first arm 84 of housing cover 80. Similarly, the rotational movement of actuator 90 in the counter-clockwise direction causes the first end of second lock-release strap 112 to move generally laterally to the right in order to move the second end of the second lock-release strap 112 upwardly along second arm 86 of housing cover 80.

Figure 5:
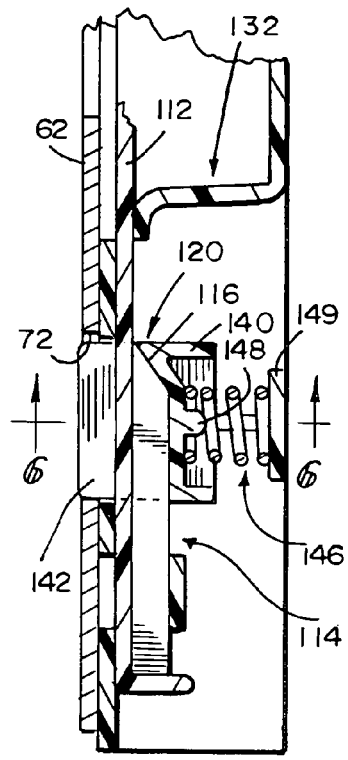
FIG. 5 is a sectional view taken along line 5—5 of FIG. 4 showing one lock the lock-release mechanism biased to the locked position such that an arm of the lock is received within one of the slots formed in the slide rail coupled to the back support.
Figure 7:
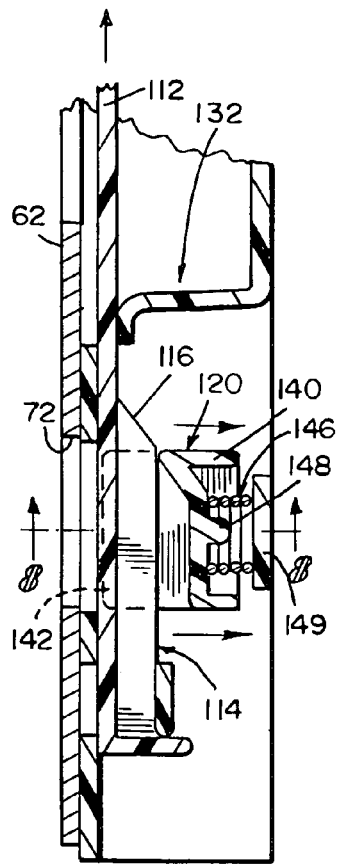
FIG. 7 is a sectional view similar to FIG. 5 showing the lock having been moved to the unlocked position by upward movement of the cam to move the lock against the bias of the spring to a position disengaged from the slide rail to permit up and down movement of the headrest.
Figure 9:
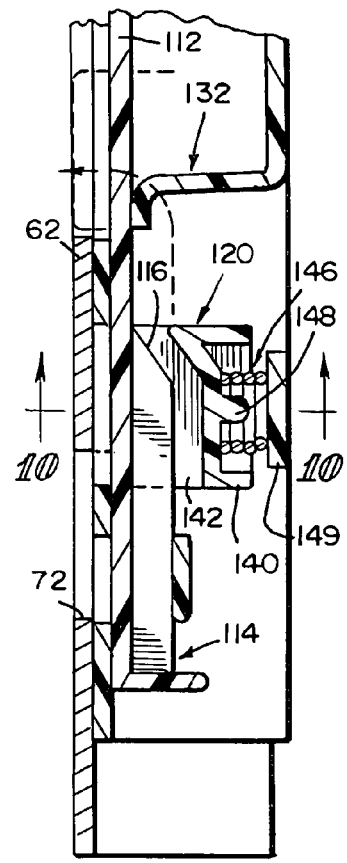
FIG. 9 is a sectional view similar to FIGS. 5 and 7 showing the lock remaining in the unlocked position by the cam and also showing the headrest and housing cover having been moved upwardly relative to the back support in order to adjust a height of the headrest above the seat bottom of the seat shell.
Figure 6:
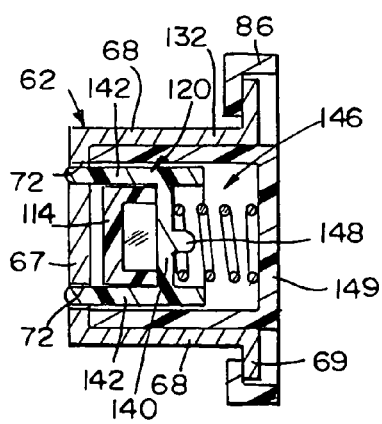
FIG. 6 is a sectional view taken along line 6—6 in FIG. 5.
Figure 8:
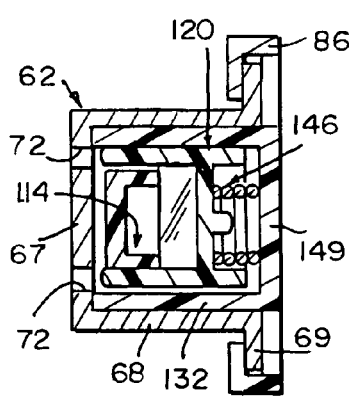
FIG. 8 is a sectional view taken along line 8—8 of FIG. 7.
Figure 10:
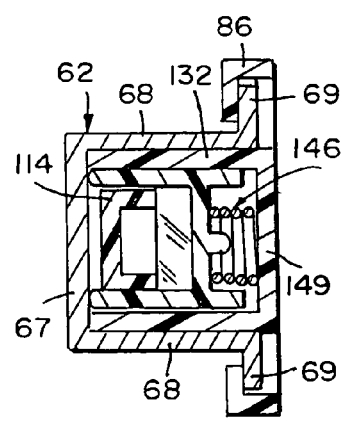
FIG. 10 is a sectional view taken along line 10—10 of FIG. 9.

As the second end of each lock-release strap 110, 112 is moved upwardly, the cam face 116 of the cam 114 at the second end of each lock-release strap 110, 112 engages each respective lock 120 within lock housings 130, 132. Specifically, each respective cam face 116 engages a portion of the main body 140 of each lock 120, as shown in FIGS. 5 and 6. As each cam face 116 is moved upwardly, the respective locks 120 are urged to move against the bias of each respective spring 146 to the disengaged position (shown in FIGS. 7–10) disengaged from the slots 72 of the first and second slide rails 60, 62. Once each lock 120 is disengaged from the respective first and second slide rails 60, 62, the lock-release mechanism 26 and thus the height-adjustment mechanism 18 are in the unlocked position and the housing cover 80 and headrest 20 are able to be moved up or down relative to the seat shell 13 to adjust a height of the headrest 20 above seat bottom 22. In order to move the headrest 20 up or down after unlocking the height-adjustment mechanism 18, the user may simply grasp the wing members 50, 52 or any other portion of the headrest 20 and/or housing cover 80 and manually move the headrest 20 upwardly or downwardly as desired.

Once the headrest 20 and housing cover 80 have been moved and realigned with another set of slots 72 corresponding to a different height of the headrest 20 above seat bottom 22, the springs 146 associated with each lock 120 will automatically bias the each lock 120 into the locked position to once again lock headrest 20 in place relative to seat shell 13. Rotational return spring 106 also operates to bias automatically actuator 90 to the locked position which disengages the respective cam faces 116 from each lock 120 in order to allow springs 146 to bias each lock 120 to the locked position engaged with the respective slide rails 60, 62.

The invention claimed is:

1. A juvenile seat comprising a seat shell including a seat bottom and a back support coupled to the seat bottom, a headrest coupled to the seat shell for up-and-down movement relative to the seat shell to adjust a height of the headrest above the seat bottom of the seat shell, and a height-adjustment mechanism arranged to adjust the height of the headrest above the seat bottom, the height-adjustment mechanism including a dial actuator coupled to the back support for rotational movement relative to the back support, the dial actuator actuating a lock-release mechanism of the height-adjustment mechanism and freeing the headrest for up-and-down movement relative to the seat shell.

2. The juvenile seat of claim 1, wherein the lock-release mechanism includes a cam coupled to the dial actuator for movement with the dial actuator and a lock coupled to the headrest and movable between a locked position engaged with the back support of the seat shell and an unlocked position disengaged from the back support of the seat shell.

3. The juvenile seat of claim 2, further comprising vertically-spaced lock-receiving slots provided on the back support of the seat shell and wherein the lock includes an arm received within one of the lock-receiving slots in the locked position and disengaged from the lock-receiving slots in the unlocked position.

4. The juvenile seat of claim 3, wherein the lock-release mechanism further includes a spring arranged to bias the lock to the locked position received within one of the lock-receiving slots and the cam includes an angled cam surface arranged to engage the lock and move the lock to the unlocked position when the dial actuator is rotated about the axis.

5. The juvenile seat of claim 2, wherein the lock-release mechanism further includes a coupling-member having a first end coupled to the dial actuator and a second end coupled to the cam and wherein rotational movement of the dial actuator is translated through the coupling-member to cause the cam to move upwardly and downwardly.

6. The juvenile seat of claim 5, wherein the coupling member is flexible.

7. The juvenile seat of claim 1, wherein the height-adjustment mechanism includes a housing cover coupled to the headrest for up and down movement with the headrest, a lock coupled to the housing cover and arranged to move relative to the housing cover between a locked position engaged with the back support of the seat shell and an unlocked position disengaged from the back support, and a cam coupled to the dial actuator for movement with the actuator to engage the lock and move the lock to the unlocked position.

8. The juvenile seat of claim 7, wherein the headrest includes a main body and first and second wing members coupled to the main body and oriented to lie at an angle relative to the main body and wherein the housing cover includes an upper portion engaged with the main body of the headrest, a first wing portion engaged with the first wing member of the headrest, and a second wing portion engaged with the second wing member of the headrest.

9. The juvenile seat of claim 8, wherein the dial actuator is coupled to the upper portion of the housing cover.

10. The juvenile seat of claim 1, wherein the dial actuator is arranged to rotate relative to the back support about an axis generally perpendicular to a plane through the back support.

11. The juvenile seat of claim 10, wherein the back support is positioned between the headrest and the dial actuator.

12. The juvenile seat of claim 1, wherein the dial actuator includes a first lug coupled to a first lock of the lock-release mechanism and a second lug coupled to a second lock of the lock-release mechanism and the dial actuator is arranged to move from a first position where the first and second locks are engaged with the back support of the seat shell to a second position where the first and second locks are disengaged from the back support of the seat shell.

13. A juvenile seat comprising a seat shell including a seat bottom and a back support arranged to extend upwardly from the seat bottom, a headrest coupled to the seat shell for up-and-down movement relative to the seat shell to adjust a height of the headrest above the seat bottom of the seat shell, and a height-adjustment mechanism arranged to adjust the height of the headrest above the seat bottom, the height-adjustment mechanism including a housing cover coupled to the headrest and movable with the headrest and a twist actuator coupled to the housing cover, the twist actuator moving between a locked position preventing up and down movement of the headrest relative to the seat shell and an unlocked position permitting up and down movement of the headrest relative to the seat shell.

14. The juvenile seat of claim 13, wherein the height-adjustment mechanism further includes a first set of vertically-spaced lock-receiving locators provided in a first guide rail coupled to the back support of the seat shell and a first lock arranged to move between a first position received within one of the first set of lock-receiving locators when the height-adjustment mechanism is in the locked position and a second position disengaged from the first guide rail when the height-adjustment mechanism is in the unlocked position, and the actuator is coupled to a rear side of the housing cover.

15. The juvenile seat of claim 14, wherein the height-adjustment mechanism further includes a flexible member having a first end coupled to the actuator and a second end arranged to engage the first lock and move the first lock from the first position to the second position.

16. The juvenile seat of claim 15, further comprising a cam coupled to the flexible member and wherein the actuator is arranged to move relative to the housing cover from a first position to a second position and the flexible member is arranged to move with the actuator such that the cam is disengaged from the first lock when the actuator is in the first position and is engaged with the first lock when the actuator is in the second position.

17. The juvenile seat of claim 15, wherein a second end of the flexible member includes a cam having an angled surface formed to engage the first lock and urge the first lock from the first position to the second position.

18. The juvenile seat of claim 14, wherein the first set of lock-receiving locators are slots and the lock includes an arm received within one of the slots when the lock is in the first position.

19. The juvenile seat of claim 14, further comprising a second set of lock-receiving locators provided in a second guide rail spaced-apart from the first guide rail and coupled to the back support of the seat shell and a second lock arranged to move between a first position received within one of the second set of lock-receiving locators when the height-adjustment mechanism is in the locked position and a second position disengaged from the guide rail when the height-adjustment mechanism is in the unlocked position.

20. The juvenile seat of claim 19, further comprising a first member having a first end coupled to the actuator and a second member having a first end coupled to the actuator, wherein the first and second members are arranged to move with the actuator relative to the housing cover and a second end of the first member includes a first cam arranged to engage the first lock when the actuator is in the unlocked position and a second end of the second member includes a second cam arranged to engage the second lock when the actuator is in the unlocked position.

21. The juvenile seat of claim 20, wherein the actuator rotates between the locked and unlocked positions about an axis generally perpendicular to a plane through the back support and the first and second cams of the respective first and second members are arranged to move upwardly along the back support of the shell when the actuator is rotated between the locked and unlocked positions.

22. The juvenile seat of claim 20, wherein the first and second members are made from a flexible material.

23. The juvenile seat of claim 19, wherein the housing cover includes a first guide system and a second guide system and the first member is positioned within the first guide system and the second member is positioned within the second guide system.

24. The juvenile seat of claim 23, wherein the first guide system is generally L-shaped and extends between the actuator and the first lock and the second guide system is generally L-shaped and extends between the actuator and the second lock.

25. The juvenile seat of claim 13, wherein the headrest includes a top surface and the back support includes a top surface and the top surface of the headrest is positioned above the top surface of the back support when the headrest is in a lowest position with respect to the seat bottom of the seat shell.

26. The juvenile seat of claim 25, wherein the headrest includes an aperture arranged to receive a shoulder strap portion of a vehicle seat belt.

27. The juvenile seat of claim 13, wherein an upper section of the back support is positioned between the headrest and the housing cover.

28. The juvenile seat of claim 13, further comprising a first guide rail coupled to the back support and a second guide rail coupled to the back support and spaced-apart from the first guide rail, and wherein the housing cover is generally U-shaped and includes an upper portion coupled to the headrest for up and down movement with the headrest, a first arm coupled to the upper portion and received within the first guide rail for up and down movement within the first guide rail, and a second arm coupled to the upper portion and received within the second guide rail for up and down movement within the second guide rail.

29. The juvenile seat of claim 28, wherein the actuator is coupled to the upper portion of the housing cover.

30. The juvenile seat of claim 29, wherein the height-adjustment mechanism further includes a spring arranged to bias the actuator to the first position.

31. The juvenile seat of claim 29, wherein the actuator is arranged to rotate about an axis generally perpendicular to a plane defined by the back support of the seat shell.

32. The juvenile seat of claim 28, wherein the height-adjustment mechanism further includes a first lock coupled to the first arm of the housing cover and a second lock coupled to the second arm of the housing cover, the first lock is arranged to move from a first position engaged with the first guide rail and a second position disengaged from the first guide rail; and the second lock is arranged to move from a first position engaged with the second guide rail and a second position disengaged from the second guide rail.

33. The juvenile seat of claim 32, wherein the height-adjustment mechanism includes a first spring arranged to bias the first lock in a direction toward the back support of the seat shell and a second spring arranged to bias the second lock in a direction toward the back support of the seat shell.

34. The juvenile seat of claim 32, further comprising a first member having a first end coupled to the actuator and a second end defining a first cam and a second member having a first end coupled to the actuator and a second end defining a second cam.

35. The juvenile seat of claim 34, wherein the first cam includes a cam surface arranged to engage the first lock to move the first lock from the first position to the second position and the second cam includes a cam surface arranged to engage the second lock to move the second lock from the first position to the second position.

36. A juvenile seat comprising a seat shell having a seat bottom and back support coupled to the seat bottom, a headrest coupled to the back support and arranged to move upwardly and downwardly relative to the back support, a lock coupled to the headrest for up and down movement with the headrest, the lock being moveable between a locked position engaged with the back support of the seat shell preventing the headrest from being moved upwardly and downwardly relative to the seat shell and an unlocked position disengaged from the back support of the seat shell permitting the headrest to move upwardly and downwardly relative to the seat shell, and a cam coupled to the headrest for up and down movement with the headrest, the cam being movable upwardly and downwardly relative to the headrest engaging the lock and biasing the lock from the locked position to the unlocked position, and a rotatable actuator coupled to the cam, and wherein the headrest is moveable from a first position where the cam is disengaged from the lock and a second position where the cam is engaged with the lock.

37. The juvenile seat of claim 36, further comprising a spring coupled to the rotatable actuator to bias the rotatable actuator to the first position.

38. The juvenile seat of claim 36, further comprising a generally L-shaped guide rail coupled to the headrest for up and down movement with the headrest and a coupling member coupled at a first end to the actuator and at a second end to the cam such that rotational movement of the actuator from the first position to the second position urges the cam to move upwardly.

39. The juvenile seat of claim 36, further comprising a spring coupled to the lock to urge the lock to move to the locked position in a direction toward the back support of the seat shell generally perpendicular to a plane defined by the back support of the seat shell.

40. The juvenile seat of claim 36, further including a slide rail coupled to the back support of the seat shell, wherein the slide rail includes a vertical channel formed to receive the lock and guide the lock as the headrest is moved upwardly and downwardly and the channel is defined by an end wall including a plurality of vertically-spaced slots formed to receive the lock when the lock is in the locked position.

41. The juvenile seat of claim 36, further comprising a housing cover coupled to the headrest for up and down movement with the headrest, and wherein an upper section of the back support is positioned between the headrest and the housing cover.

42. The juvenile seat of claim 41, further including an actuator coupled to the housing cover for rotational movement relative to the housing cover wherein the cam is coupled to the actuator for movement with the actuator between a first position disengaged from the lock and a second position engaged with the lock.

43. A juvenile seat comprising a seat shell including a seat bottom and a back support coupled to the seat bottom, a headrest coupled to the seat shell for up-and-down movement relative to the seat shell to adjust a height of the headrest above the seat bottom of the seat shell, and a height-adjustment mechanism arranged to adjust the height of the headrest above the seat bottom, the height-adjustment mechanism including a twist actuator means for rotational movement to actuate a lock-release mechanism of the height-adjustment mechanism to free the headrest for up-and-down movement relative to the seat shell.

* * * * *